United States Patent
Undery et al.

(10) Patent No.: US 8,364,774 B2
(45) Date of Patent: *Jan. 29, 2013

(54) SUSTAINING SESSION CONNECTIONS

(75) Inventors: James Undery, Seattle, WA (US); Mark Markaryan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,146

(22) Filed: Jun. 13, 2011

(65) Prior Publication Data

US 2011/0246595 A1    Oct. 6, 2011

Related U.S. Application Data

(63) Continuation of application No. 10/881,251, filed on Jun. 30, 2004, now Pat. No. 7,962,623.

(51) Int. Cl.
G06F 15/16 (2006.01)
G06F 15/177 (2006.01)
H04W 4/00 (2009.01)

(52) U.S. Cl. ....................................... 709/207
(58) Field of Classification Search ............... None
See application file for complete search history.

(56) References Cited

U.S. PATENT DOCUMENTS

| | | | |
|---|---|---|---|
| 6,212,175 B1 | 4/2001 | Harsch | |
| 6,266,701 B1 | 7/2001 | Sridhar et al. | |
| 6,397,253 B1 | 5/2002 | Quinlan et al. | |
| 6,678,735 B1 | 1/2004 | Orton et al. | |
| 6,728,365 B1 * | 4/2004 | Li et al. | 379/329 |
| 6,970,909 B2 | 11/2005 | Schulzrinne | |
| 7,020,098 B2 | 3/2006 | Ehrsam et al. | |
| 7,080,151 B1 | 7/2006 | Borella et al. | |
| 7,103,067 B1 | 9/2006 | Singh et al. | |
| 7,136,635 B1 | 11/2006 | Bharatia et al. | |
| 7,171,473 B1 | 1/2007 | Eftis et al. | |
| 7,272,148 B2 | 9/2007 | Zhang et al. | |
| 7,353,279 B2 | 4/2008 | Durvasula et al. | |
| 7,359,354 B2 * | 4/2008 | Julka et al. | 370/331 |
| 7,395,336 B1 * | 7/2008 | Santharam et al. | 709/227 |
| 7,480,305 B1 | 1/2009 | Somasundaram | |
| 7,483,437 B1 | 1/2009 | Mohaban | |
| 7,496,672 B2 * | 2/2009 | Orton et al. | 709/230 |
| 7,539,759 B2 * | 5/2009 | Narayanan et al. | 709/227 |
| 7,555,555 B2 * | 6/2009 | Park et al. | 709/227 |
| 7,594,259 B1 * | 9/2009 | Audet et al. | 726/11 |
| 7,640,300 B2 | 12/2009 | Wohlgemuth et al. | |
| 7,650,415 B1 | 1/2010 | Peterson | |

(Continued)

FOREIGN PATENT DOCUMENTS

EP    1 191 757    3/2002

OTHER PUBLICATIONS

RFC 2460.

(Continued)

*Primary Examiner* — Ranodhi Serrao
*Assistant Examiner* — Muktesh G Gupta
(74) *Attorney, Agent, or Firm* — Merchant & Gould P.C.

(57) ABSTRACT

In an embodiment, techniques for sustaining session connections are provided. The techniques send heartbeat messages when not sending a message may cause the session connection to close because of a timeout condition. Heartbeat messages are valid transport layer messages that will be ignored by protocols at higher levels of a data communications stack. As an example, the techniques may send a TCP message containing only a carriage return and line feed ("CRLF") in its payload. Because the TCP layer considers a message containing only a CRLF to be a valid TCP message, intermediary computing devices such as proxy servers may not interpret heartbeat messages as "keep alive" messages, and may sustain session connections.

22 Claims, 8 Drawing Sheets

U.S. PATENT DOCUMENTS

| | | |
|---|---|---|
| 7,668,100 B2 * | 2/2010 | Balasaygun et al. .......... 370/235 |
| 7,715,334 B2 * | 5/2010 | Harsch .......................... 370/311 |
| 7,962,623 B2 | 6/2011 | Undery et al. |
| 2003/0128676 A1 * | 7/2003 | Lee ............................... 370/328 |
| 2004/0005045 A1 | 1/2004 | Adams et al. |
| 2004/0013099 A1 | 1/2004 | O'Neill |
| 2004/0024879 A1 | 2/2004 | Dingman et al. |
| 2004/0142697 A1 | 7/2004 | Knaebchen et al. |
| 2005/0201528 A1 | 9/2005 | Meer et al. |

OTHER PUBLICATIONS

RFC 3142.

European Search Report for European Patent Application No. EP05 10 5105, Nov. 3, 2005 (3 pages).

Levin, O., Simple WG, "Review of MSRP Delivery Mechanisms," Apr. 5, 2004 (16 pages).

* cited by examiner

SUSTAINING SESSION CONNECTIONS

CROSS-REFERENCE TO RELATED APPLICATIONS

The present application claims priority to and is a continuation application of U.S. patent application Ser. No. 10/881,251, filed Jun. 30, 2004, and issuing as U.S. Pat. No. 7,962,623, the disclosure of which is hereby incorporated by reference in its entirety.

TECHNICAL FIELD

The described technology relates generally to data communications networks and, more particularly, to sustaining session connections.

BACKGROUND

Users of computing devices sometimes use their computing devices to communicate with other users. As an example, a user may communicate with another user using a computing device by sending or receiving typed messages, such as by using the MICROSOFT MESSENGER ("MESSENGER") instant messaging product. As another example, a user may communicate with another user by speaking into a microphone and hearing the other user on a speaker or headset, such as by using a Voice over Internet Protocol ("VoIP") application. These users may use a variety of computing devices such as personal computers, personal digital assistants, cellular telephones, VoIP-enabled telephones, etc.

Applications providing these types of communications services to users may also need to provide presence information. Presence information conveys an ability or willingness of a user to communicate using a computing device. Presence information can be detected automatically by computing devices or actively selected by users. A computing device may automatically observe and communicate presence information, such as a user's "status." As an example, when a user is not logged into any computing device or is not using (or logged into) an application that observes and conveys presence information, the user's status may be automatically indicated as "off-line." When the user starts or logs into an application that observes and conveys presence information, such as MESSENGER, the user's status may be automatically indicated as "on-line." When the user performs no actions on the computing device for a period of time, the application may automatically indicate that the user is "away." Users can also actively select their status. As examples, users may indicate that they are "out for lunch" or "busy," which could be indications that they may not immediately respond to messages from other users.

Multiple computing devices may register this presence information with a registration server computing device so that a "watcher," which is an application desiring to determine a user's status, can determine meaningful presence information by querying the registration server or subscribing to automatically receive presence information. As an example, MESSENGER may indicate to the registration server that the user has not performed any actions on the computing device for a period of time, and so the user's presence information could be "away." A VoIP-enabled phone may indicate to the registration server that the user has placed a phone call, and so the user's presence information could be "on the phone." When a watcher receives this presence information from the registration server, it may determine that the user's status is "on the phone and unable to respond to messages on the computing device." If, however, the user begins to perform actions on the computing device, the watcher may determine that the user's status is "on the phone, but able to respond to messages on the computing device." If the user actively indicates on the computing device that the user's status is "away" and uses a VoIP-enabled phone, then the watcher may determine that the user's status is "roaming."

Communications applications sometimes need to establish and manage sessions between computing devices. A session is a set of interactions between computing devices that occurs over a period of time. As an example, real-time communications applications such as MESSENGER or VoIP establish sessions between communicating devices on behalf of users. These applications may use various mechanisms to establish sessions, such as a "Session Initiation Protocol" ("SIP"). SIP is an application-layer control protocol that computing devices can use to discover one another and to establish, modify, and terminate sessions between computing devices.

Applications may employ SIP with another protocol to send or receive information. By using SIP with other protocols, applications can create and manage a session and exchange information during the session. The protocol employed with SIP to exchange information may segment the information into messages. As an example, a VoIP application may segment a long narration into shorter messages. Exchanging messages during a session is referred to as a "dialog." SIP may use lower-level communications layers to transport a dialog's messages, such as Transmission Control Protocol/Internet Protocol ("TCP/IP"), which are commonly employed transport- and network-layer protocols.

Transmission Control Protocol ("TCP") is a connection-oriented, reliable delivery transport layer protocol. TCP is typically described as a transport layer that provides an interface between an application layer (e.g., an application using SIP) and a network layer. The application layer generally communicates with the TCP layer by sending or receiving a stream of data (e.g., a number of bytes of data). TCP organizes this datastream into segments that can be carried by the protocol employed at the network layer, e.g., the Internet Protocol ("IP"). These segments of data are commonly referred to as "packets," "frames," or "messages." Each message generally comprises a header and payload. The header comprises data necessary for routing and interpreting the message. The payload comprises the actual data that is being sent or received. The application, transport, and network layers, together with other layers, are jointly referred to as a data communications stack.

Messages in a connection may transit intermediary computing devices. When a transport or network layer of a sending computing device's data communications stack establishes a connection with a corresponding layer of a data communications stack in a receiving computing device, messages exchanged by the computing devices may transit several intermediary computing devices. As examples, messages may transit proxy servers, network address translators, or gateways. These intermediary computing devices receive, process, and forward messages. As an example, a proxy server may be an intermediary between computing devices connected to an intranet and computing devices connected to the Internet. This proxy server may attempt to make the intranet more secure by, e.g., ignoring connection requests from outside the intranet.

Intermediary computing devices may terminate idle connections between two computing devices to use network resources efficiently. As an example, a MESSENGER or VoIP application executing on a user's computing device connected to an intranet ("computing device A") may establish a SIP-based session with an application executing on another computing device connected to the Internet ("computing device B"). This session may use a TCP/IP connection between computing devices A and B, and messages exchanged by the computing devices may transit a proxy server. When no messages are exchanged in the connection for a period of time, the proxy server may close the connection between it and computing device B to conserve network resources. However, computing device A may be unaware that the connection is closed because its connection to the proxy server remains open. As a result, the application executing on computing device B may mistakenly assume that the application (or user) of computing device A is no longer online or using the connection. Moreover, to make the intranet to which the proxy server is connected more secure, the proxy server may ignore connection requests from devices not connected to the intranet, such as computing devices connected to the Internet. Consequently, the application executing on computing device B, which is connected to the Internet, may be unable to query the application executing on computing device A for its status or request to reestablish a session.

Intermediary computing devices may close connections even when computing devices use a "keep-alive" mechanism. Some computing devices employ a keep-alive mechanism to keep a connection alive despite a lack of messages. This mechanism involves sending "keep-alive" messages to indicate that the sender has not closed the connection. However, efficient intermediary computing devices may recognize keep-alive messages and, while keeping alive connections between the sending computing devices and the intermediary computing device, may terminate the connection to the recipient indicated in the keep-alive message (e.g., to computing devices connected to the Internet).

A connection may be sustained by sending a valid message of an application layer. As an example, a SIP application employing TCP in a transport layer may periodically send a valid SIP message, such as a REGISTER message. A REGISTER message may be used to enable a SIP server to associate a Uniform Resource Identifier ("URI") of the sender of the message with the computing device used by the sender. When the valid SIP message cannot be sent or received, the SIP application may detect that its TCP connection is unavailable. A problem with sending REGISTER, or indeed any valid SIP message containing valid data, is that doing so could be computationally intensive when multiple clients and servers need to do so to sustain connections. In the case of REGISTER messages, a server receiving such a message may need to parse the message to determine the URI and the identity of the sender's computing device, and may further need to store the data in a database that is possibly on another server.

Thus, an effective approach to sustaining session connections that does not rely on TCP keep-alives or extensive computational processing of messages would have significant utility.

SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. A specification relating to presence information in instant messaging systems, "RFC 2778," is available at <http://www.ietf.org/rfc/rfc2778.txt>. A draft of a proposed specification relating to presence information in SIP is available at <http://www.ietf.org/internet-drafts/draft-ietf-simple-presence-10.txt>. All four of these specifications are incorporated herein in their entirety by reference.

SUMMARY

In an embodiment, techniques for sustaining session connections are provided. The techniques send heartbeat messages when not sending a message may cause the session connection to close because of a timeout condition. Heartbeat messages are valid transport layer messages that will be ignored by protocols at higher levels of a data communications stack. As an example, the techniques may send a TCP message containing only a carriage return and line feed ("CRLF") in its payload. Because the TCP layer considers a message containing only a CRLF to be a valid TCP message, intermediary computing devices such as proxy servers may not interpret heartbeat messages as "keep alive" messages, and may sustain session connections.

DETAILED DESCRIPTION

In an embodiment, techniques for sustaining session connections are provided. The techniques send heartbeat messages when not sending a message may cause the session connection to close because of a timeout condition. Heartbeat messages are valid transport layer messages containing a non-empty payload that will be ignored by protocols at higher levels of a data communications stack. As an example, the techniques may send a TCP message containing only a carriage return and line feed ("CRLF") in its payload. Because the TCP layer considers a message containing only a CRLF to be a valid TCP message, intermediary computing devices such as proxy servers may reset a message clock relating to the connection in which the message was sent or received. The message clock indicates an amount of time that has elapsed since a message was last sent or received in the connection. When the message clock of a connection indicates that a threshold amount of time has elapsed (e.g., indicating that a timeout condition has occurred), an intermediary computing device may close the connection. Because the message clock is reset when a message is sent or received, the connection may not be closed unless another message is not sent or received before the threshold amount, of time elapses.

When the TCP layer of the recipient computing device forwards the received heartbeat message to a higher layer of its data communications stack, the higher layer may ignore the heartbeat message. As an example, SIP may ignore otherwise valid SIP messages that contain only white space, such as spaces, tabs, carriage returns, line feeds, or CRLFs. If messages containing information other than CRLFs are received, the higher layer may attempt to interpret these messages as containing information that cannot be ignored. In various embodiments, the heartbeat may contain merely carriage returns, line feeds, or any data that would be valid at the transport layer but ignored by higher layers of the data communications stack. Thus, by sending valid transport layer messages, such as heartbeat messages that are ignored by SIP, the techniques can sustain session connections even when no information is exchanged between computing devices at layers of the data communications stack higher than the transport layer. What sorts of messages are valid but ignored may be defined in a protocol's specification or definition.

In an embodiment, messages ignored by layers above a transportation layer may include, e.g., carriage returns, line feeds, spaces, tabs, or any white space characters in general. In an embodiment, such messages containing merely white space characters may end with a carriage return or line feed. Characters that can be used in messages to sustain connections without causing excessive computational burden may be determined by analyzing the protocols used above the protocol that could close connections (e.g., TCP).

Figure 1:
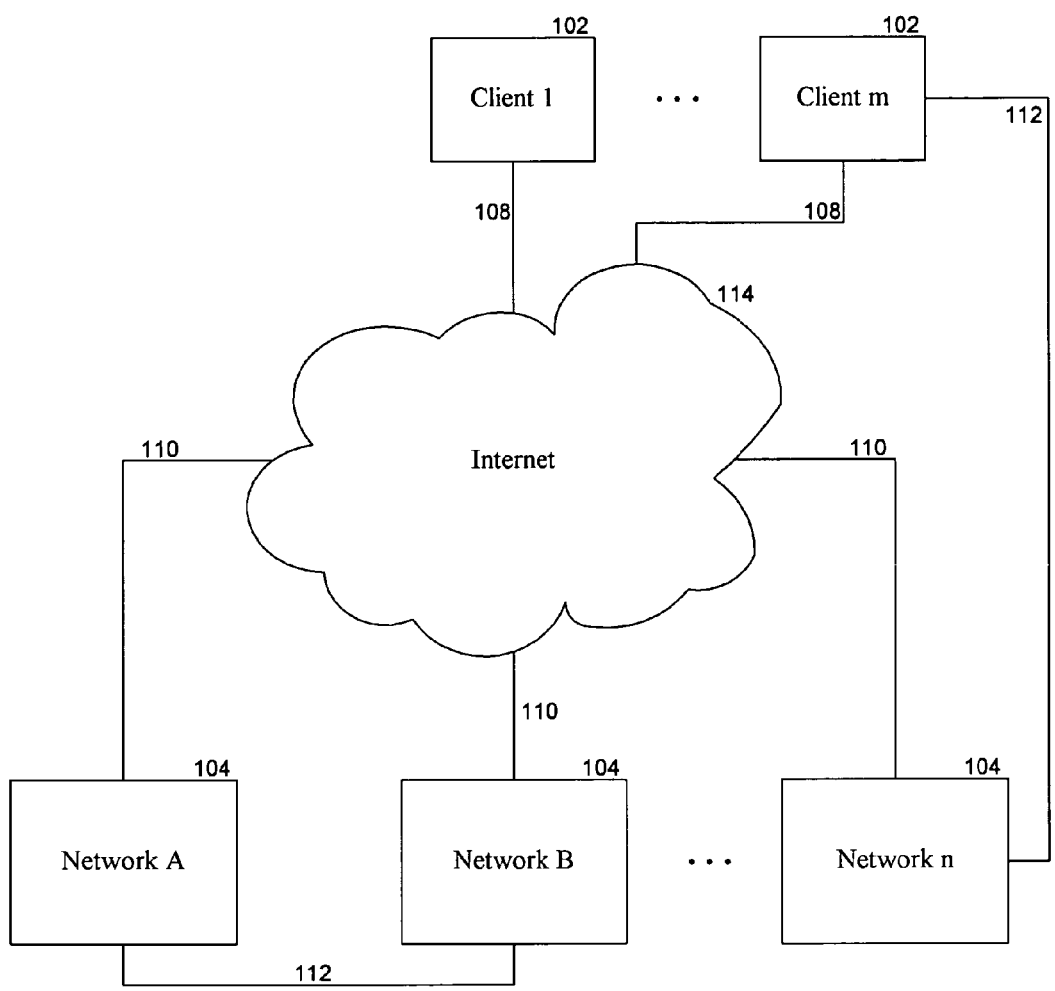
FIG. 1 is a block diagram illustrating an embodiment of a system for sustaining session connections.

Turning now to the Figures, FIG. 1 is a block diagram illustrating an embodiment of a system for sustaining session connections. The system may comprise one or more clients 102, one or more networks 104, and a network to connect the clients and the networks, such as the Internet 114. The clients may be connected to the Internet via a network connection 108. The networks 104 may be connected to the Internet using various forms of data communications links 110. Clients may be, e.g., computers, cellular telephones, or other devices connected to the Internet. Networks may be, e.g., intranets. Clients may also be directly connected to networks using private data communications links 112. Similarly, networks may be directly connected to other networks using private data communications links 112. The Internet may also be connected to various other computing devices (not shown). The connections described herein can be physical, wireless, and indeed any form of data communications network connection.

Figure 2:
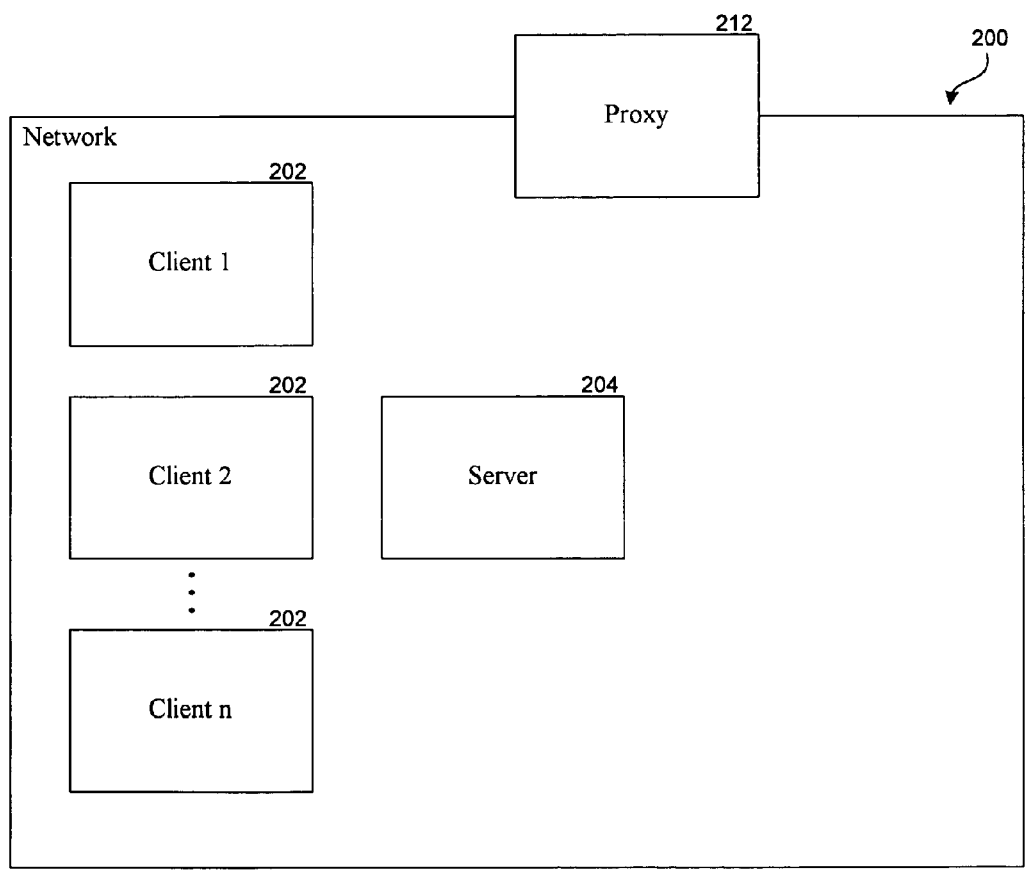
FIG. 2 is a block diagram illustrating an embodiment of a network of FIG. 1.

FIG. 2 is a block diagram illustrating an embodiment of a network of FIG. 1. The network 200 comprises one or more clients 202, a server 204, and edge proxy server 212. The network may also comprise other devices (not shown). The illustrated devices of the network (and those not shown) may be interconnected via a data communications network associated with the network (not shown). The clients 202 and server 204 may perform various activities, including exchanging SIP messages. An edge proxy server 212 is connected both to the network 200 ("inside" network) and an "outside" network, e.g., the Internet (not shown). When a client desires to open a session to a server outside the network, the edge proxy may, e.g., determine whether the session should be opened and which communications link should be used.

Figure 3:
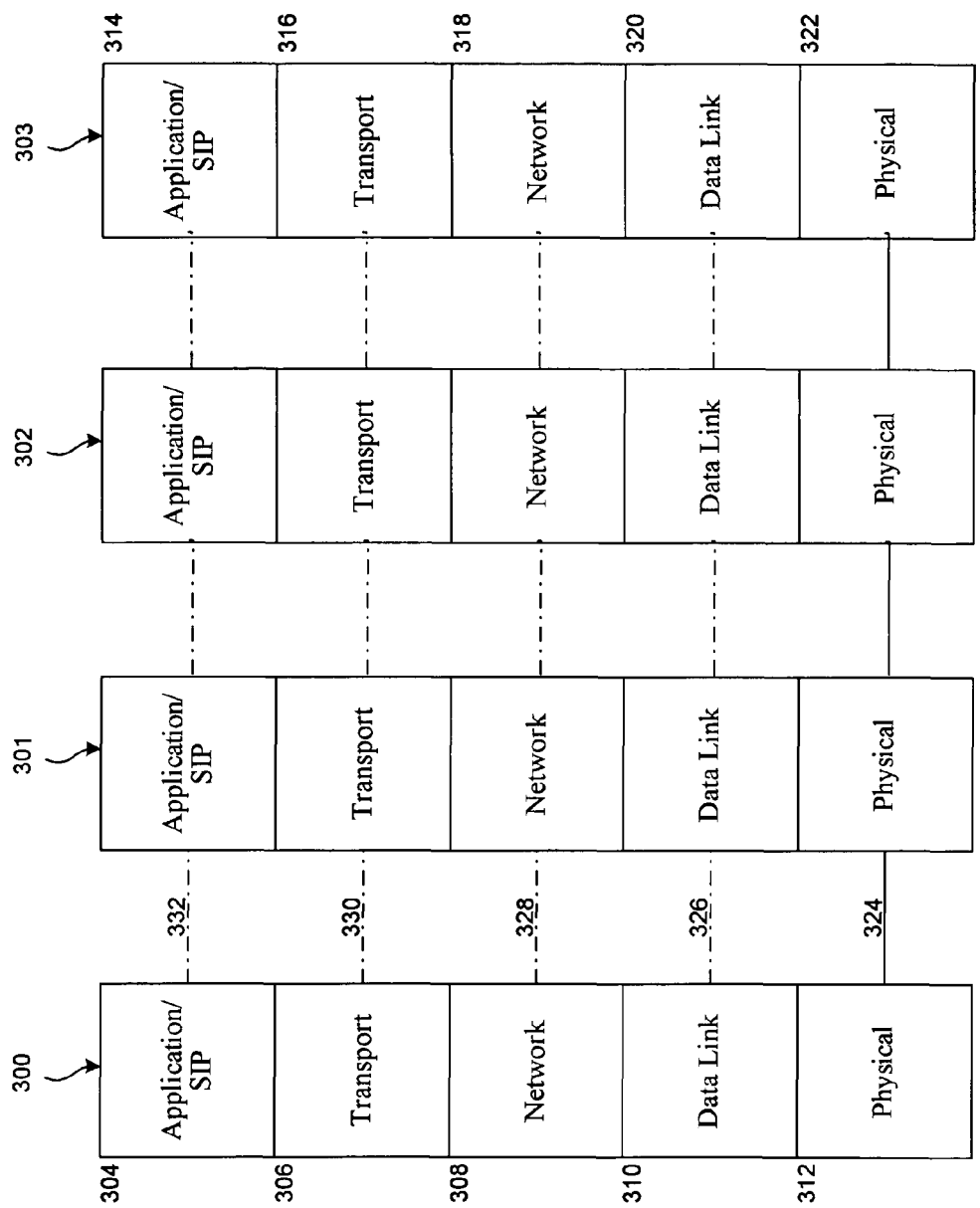
FIG. 3 is a block diagram illustrating an embodiment of data communications stacks employed by computing devices.

FIG. 3 is a block diagram illustrating an embodiment of data communications stacks employed by the computing devices of FIGS. 1 and 2. Computing devices may use one or more data communications stacks to communicate with one another. In the illustrated example, computing device 300 communicates with computing device 303 using data communications stacks associated with these computing devices. Computing devices 301 and 302 may receive and forward messages between computing devices 300 and 303 using their associated data communications stacks.

Computing device 300 has a data communications stack comprising an application layer 304, transport layer 306, network layer 308, data link layer 310, and physical layer 312. The application layer may comprise a SIP application and other applications. The SIP application may have a component or layer that communicates with the transport layer. This communications layer of the SIP application may send or receive heartbeat messages. Computing devices 301, 302, and 303 may have similar data communications stacks. Specifically, computing device 303 may have a data communications stack comprising an application layer 314, transport layer 316, network layer 318, data link layer 320, and physical layer 322. Some or all of these application layers may additionally comprise a SIP application.

When two computing devices are connected, layers of their data communications stacks may have logical or physical connections between one another. As an example, when computing device 300 is connected to computing device 303 via computing devices 301 and 302, physical layer 312 may be connected via a physical connection 324 to the physical layer of computing device 301, which may be connected via a physical connection to the physical layer of computing device 302, and which may be connected via a physical connection to the physical layer of computing device 303. The computing devices may each be connected to one another via, e.g., a modem, network interface card, or other connection, such as over the Internet. The Internet is comprised of various physical connections, such as telephone lines, microwave links, and other forms of wired and wireless physical connections that together form multiple routes for messages. Indeed, an early goal for the Internet was to make it possible for a sender to communicate with a recipient despite network outages. When computing device 300 sends data to computing device 303, the data may travel on different physical routes through the Internet.

Higher layers of data communications stacks such as data link layers 310 and 320, network layers 308 and 318, transport layers 306 and 316, and application layers 304 and 314 may be connected by logical connections, such as logical connections 326, 328, 330, and 332. When two layers of a, data communications stack have a logical connection and exchange data, the data may be sent "down" the data communications stack of the sending computing device to the physical layer of the data communications stack, across a physical connection, and then "up" the data communications stack of the receiving computing device. As an example, when a SIP application 304 of computing device 300 communicates with a SIP application 314 of computing device 303, the SIP application 304 may communicate data to transport layer 306, which may communicate the data to network layer 308, which may communicate the data to data link layer 310, which may communicate the data to physical layer 312. The physical layer 312 may communicate the data over the physical connection 324, and ultimately may communicate the data to the physical layer 322. The physical layer 322 may communicate data it receives up to data link layer 320, which may communicate the data to network layer 318, which may communicate the data to transport layer 316, which ultimately may communicate the data to the SIP application 314.

When computing devices 301 and 302 receive data on their physical connections, they may also send the data up their data communications stacks. It is possible that a lower level of the data communications stack than the application layer may be able to handle the received data without sending it to a higher layer. As an example, when SIP application 304 sends a SIP message to SIP application 314, it may send data corresponding to the SIP message to transport layer 306. The data communications stack of computing devices 301 and 302, which both receive the data on their physical layers, may communicate the received up their data communications stack to their respective transport layers. The transport layers, which recognize from the received data that the destination indicated in the data is computing device 303, may simply forward the data to transport layer 316 (via their corresponding lower levels). Thus, the application/SIP layers of computing devices 301 and 302 may not need to handle or even view the messages.

When no data is received by a transport layer of either computing device 301 or 302 over a period of time, the computing device may close the connection corresponding to a SIP session between computing devices 300 and 303. As an example, if computing device 301 fails to receive any messages on a connection from either computing device 300 or computing device 302, it may assume that the connection is no longer necessary and close the connection. Thus, further SIP messages between computing device 300 and 303 may not be able to transit a previously opened connection that transits computing devices 301 and 302.

Figure 4:
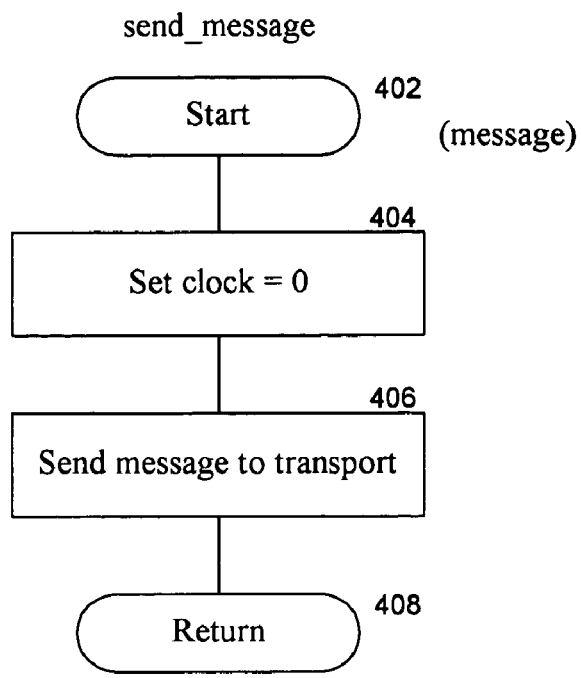
FIG. 4 is a flow diagram illustrating an embodiment of a send_message routine.

FIG. 4 is a flow diagram illustrating an embodiment of a send_message routine. The routine may be performed by an application layer component, such as a component of a SIP application, to send a message. The send_message routine may be used by, e.g., a SIP application executing on a computing device when it sends a message to a SIP application executing on another computing device. The routine begins at block 402, where it receives an indication of a message as a parameter. At block 404, the routine resets a clock value, such as by setting it to zero. The clock's value is an indication of time that has elapsed since a message was last sent. This value may be checked by components of the system to determine whether a connection should be closed. At block 406, the routine sends the message received at block 402 to the transport layer. The routine may use an application program interface exposed by the transport layer to send the message. At block 408, the routine returns to its caller.

Figure 5:
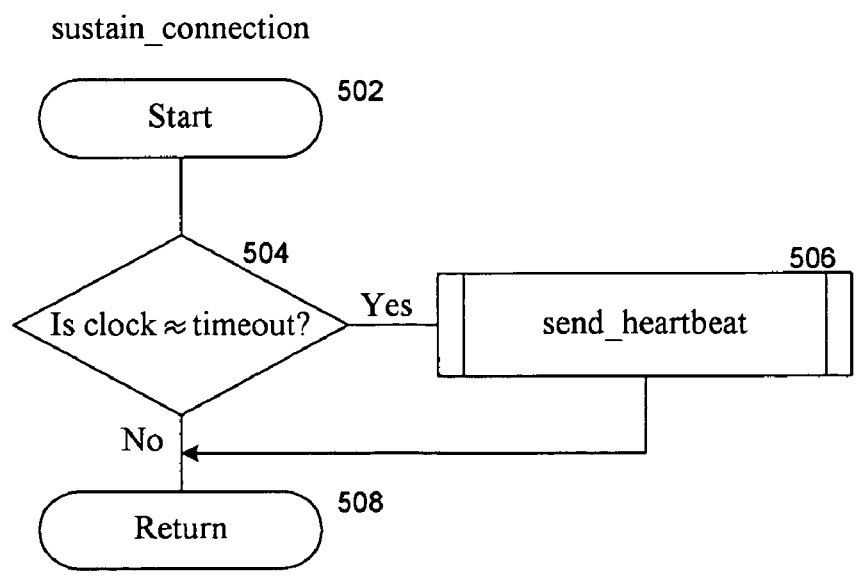
FIG. 5 is a flow diagram illustrating an embodiment of a sustain_connection routine.

FIG. 5 is a flow diagram illustrating an embodiment of a sustain_connection routine. The routine is performed by an application layer component, such as a component of a SIP application, to sustain a connection. The connection may need to be sustained when, e.g., a clock value indicating an amount of time that has elapsed since a message was last sent exceeds a timeout value. An appropriate timeout value may be determined by, e.g., using an API of the transport layer to determine a property of the transport layer, or may be defined by an administrator of the system. The routine begins at block 502. At block 504, the routine determines whether the clock value is near the timeout value. If the clock value exceeds the timeout value, it is possible that the connection may already be closed. As a result, some period of time before the timeout value should be selected. If the clock value is near the timeout value, the routine continues at block 506. Otherwise, the routine continues at block 508. At block 506, the routine calls a send_heartbeat subroutine, which sends a message that may sustain the connection. The send_heartbeat subroutine is further described below in relation to FIG. 6. At block 508, the routine returns to its caller.

The sustain_connection routine may be called repeatedly in a loop of a thread that is separate from threads that send or receive messages. Alternatively, the sustain_connection routine may be called in response to a clock event that is triggered at some specified time interval prior to the timeout.

Alternatively, the sustain_connection routine may simply send a heartbeat message at some interval less than the timeout value regardless of the clock value. As an example, if a proxy server may time out after one minute of inactivity, the routine may send a heartbeat message every 30 seconds even if a message was sent or received just a few seconds earlier.

Figure 6:
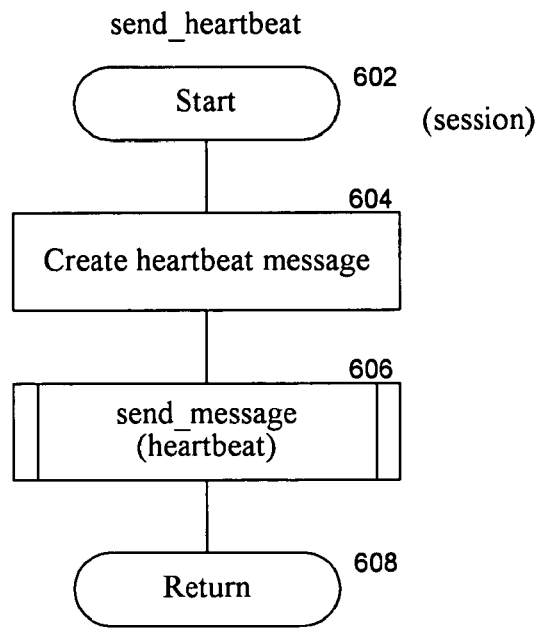
FIG. 6 is a flow diagram illustrating an embodiment of a send_heartbeat subroutine.

FIG. 6 is a flow diagram illustrating an embodiment of a send_heartbeat subroutine. The subroutine is performed by an application layer component, such as a component of a SIP application, to send a heartbeat message. The heartbeat message may be sent to sustain a connection that may close if no messages are sent in a connection over a period of time. The subroutine begins at block 602 where it receives an indication of a session as a parameter. At box 604, the subroutine creates a heartbeat message. A heartbeat message is a message that may be ignored by a layer of a data communications stack but may not be ignored by another layer of the data communications stack. As an example, a heartbeat message may be sent by a SIP application to sustain a TCP connection when the TCP connection is at risk of being closed by another computing device (e.g. a proxy server) that is handling messages between two computing devices having an open SIP session. A heartbeat message may contain, e.g., only CRLF characters. Alternatively, a heartbeat message may contain one or more spaces or tabs ending in a CRLF. A heartbeat message, instead of using a CRLF, could also use a carriage return or a linefeed character. To the TCP layer, such a message may be a valid message that resets a clock value when the message is sent or received. However, a SIP application may ignore such a message. Thus, by sending such a heartbeat message, the TCP connection may be held open, SIP presence information may thus remain accurate, and no useless information may be presented to the SIP application. In alternate embodiments, merely a carriage return or a line feed character may be sent in a heartbeat message.

At block 606, the subroutine calls the send_message subroutine and passes to it the created heartbeat message as a parameter. The send_message subroutine is described above in relation to FIG. 4. At block 608, the subroutine returns to its caller.

Figure 7:
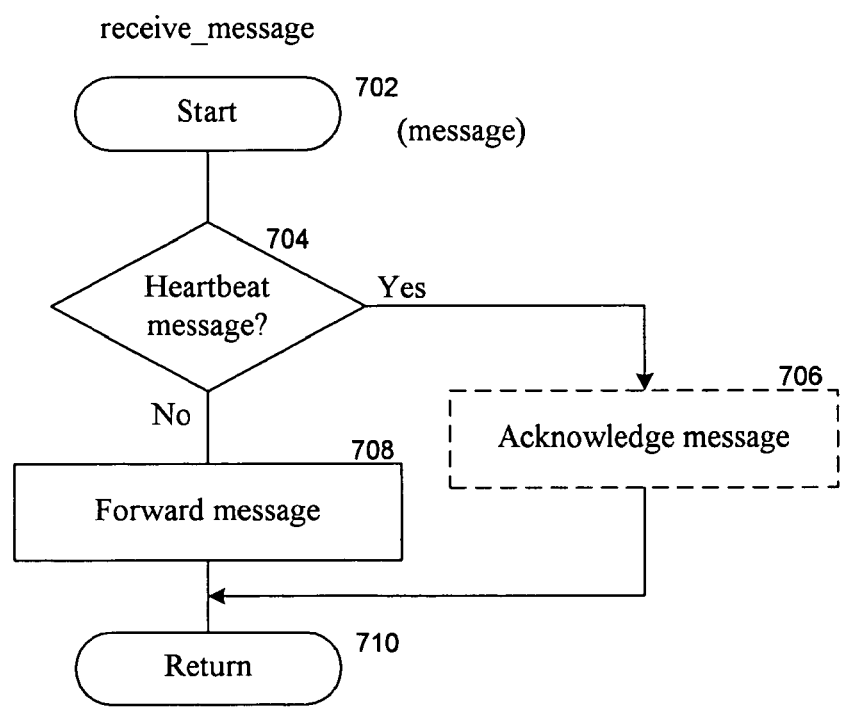
FIG. 7 is a flow diagram illustrating an embodiment of a receive_message subroutine.

FIG. 7 is a flow diagram illustrating an embodiment of a receive_message subroutine. The subroutine may be performed by an application layer component of a recipient computing device, such as a component of a SIP application. The subroutine begins at block 702, where it receives an indication of a message as a parameter. At block 704, the subroutine determines whether the received message is a heartbeat message. The subroutine may attempt to determine whether the received message is a heartbeat message by checking to see whether the message's contents are merely carriage returns, line feeds, or both. Alternatively, the receive_message subroutine may be customized to look for any other information in the message known to identify a heartbeat message. If the received message is a heartbeat message, the subroutine continues at block 706. Otherwise, the subroutine continues at block 708. At block 706, the subroutine may acknowledge the message. Typically, the transport layer acknowledges messages. However, in some cases, an application layer component may need to acknowledge messages. Because this step may be optional depending on the application layer component performing the subroutine, block 706 is indicated in dashed lines. At block 708, the subroutine may forward the message to, e.g., a SIP application. At block 710, the subroutine returns to its caller.

Upon receiving the message, the subroutine may reset a clock value (not shown) that may be used to determine whether a heartbeat message needs to be sent to sustain the session.

Figure 8:
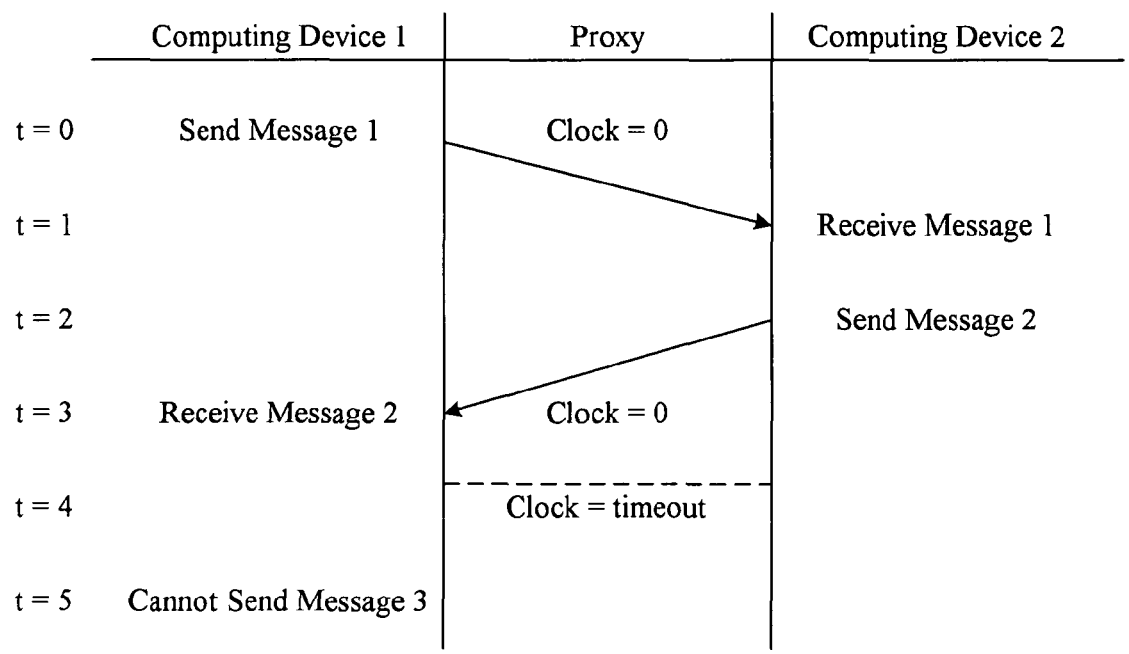
FIG. 8 is a message flow diagram illustrating message flows in an embodiment.

FIG. 8 is a message flow diagram illustrating message flows in an embodiment. In the illustrated embodiment, computing device 1 has established a SIP session with computing device 2. Messages exchanged in the session transit a proxy server. As an example, when computing device 1 sends message 1 at time 0, the message transits the proxy server and computing device 2 receives the message at time 1. Similarly, when computing device 2 sends message 2 at time 2, the message transits the proxy server before computing device 1 receives it at time 3. The proxy server may reset a clock whenever it forwards or receives a message. As an example, when the proxy server forwards message 1, it resets the clock value to 0. Similarly, when the proxy server receives message 2, it resets the clock value to 0. The clock's value may increment automatically, e.g., in response to a system clock. If the clock's value exceeds a timeout value, the proxy server may close the connection associated with the session. In the illustrated example, computing device 1 may be unable to send message 3 after the clock's value exceeds the timeout value.

Figure 9:
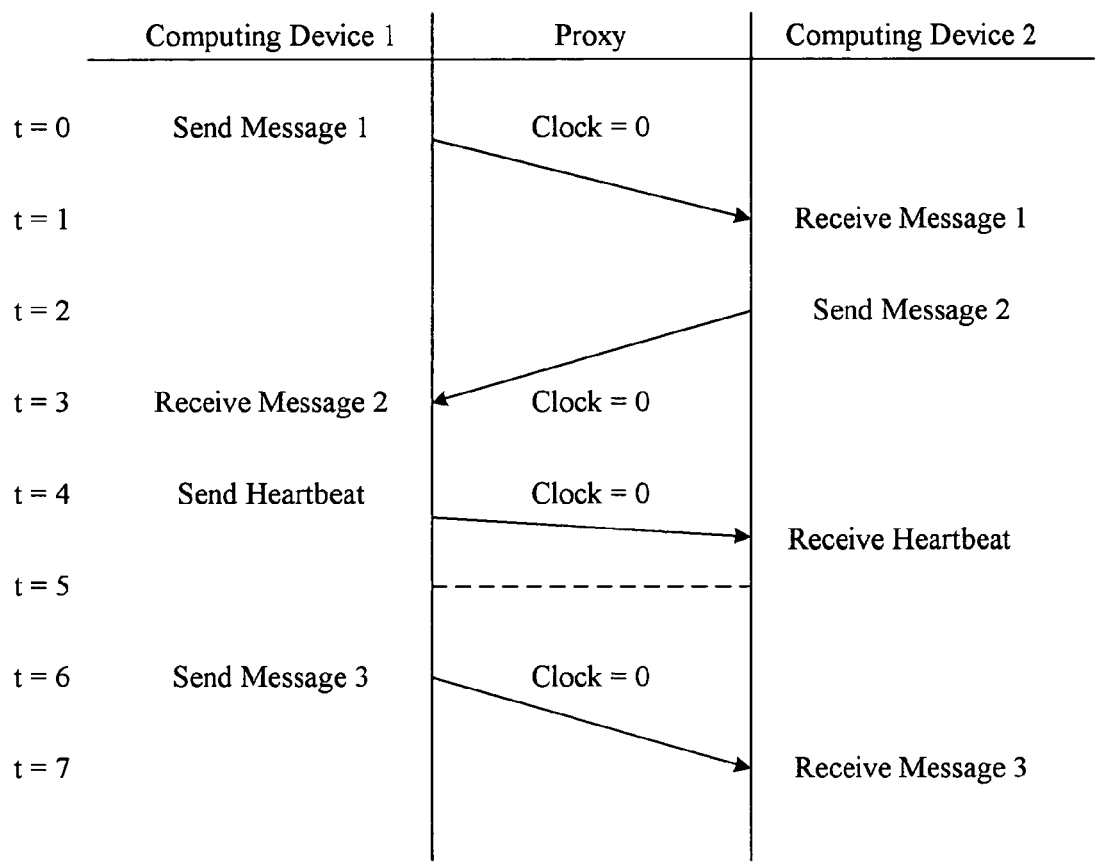
FIG. 9 is a message flow diagram illustrating message flows in an embodiment.

FIG. 9 is a message flow diagram illustrating message flows in an embodiment. In the illustrated embodiment, computing devices 1 and 2 have exchanged messages 1 and 2 between times 0 and 3, as indicated in FIG. 8 and explained above. At time 4, computing device 1, upon recognizing that a timeout is imminent (indicated in the figure by a dashed line) may send a heartbeat message to computing device 2 prior to the timeout indicated as time 5. Upon sending the heartbeat message, the proxy server may reset the clock, and so computing device 1 may be able to send message 3 at time 6 because the proxy server would not have closed the connection. By sending the heartbeat message prior to a proxy server timeout, the system is able to sustain a connection between computing devices 1 and 2. The computing device that sends the heartbeat message may need to attempt to send the heartbeat message in sufficient time that the clock value of the recipient of the heartbeat message also does not exceed the timeout value.

Figure 10:
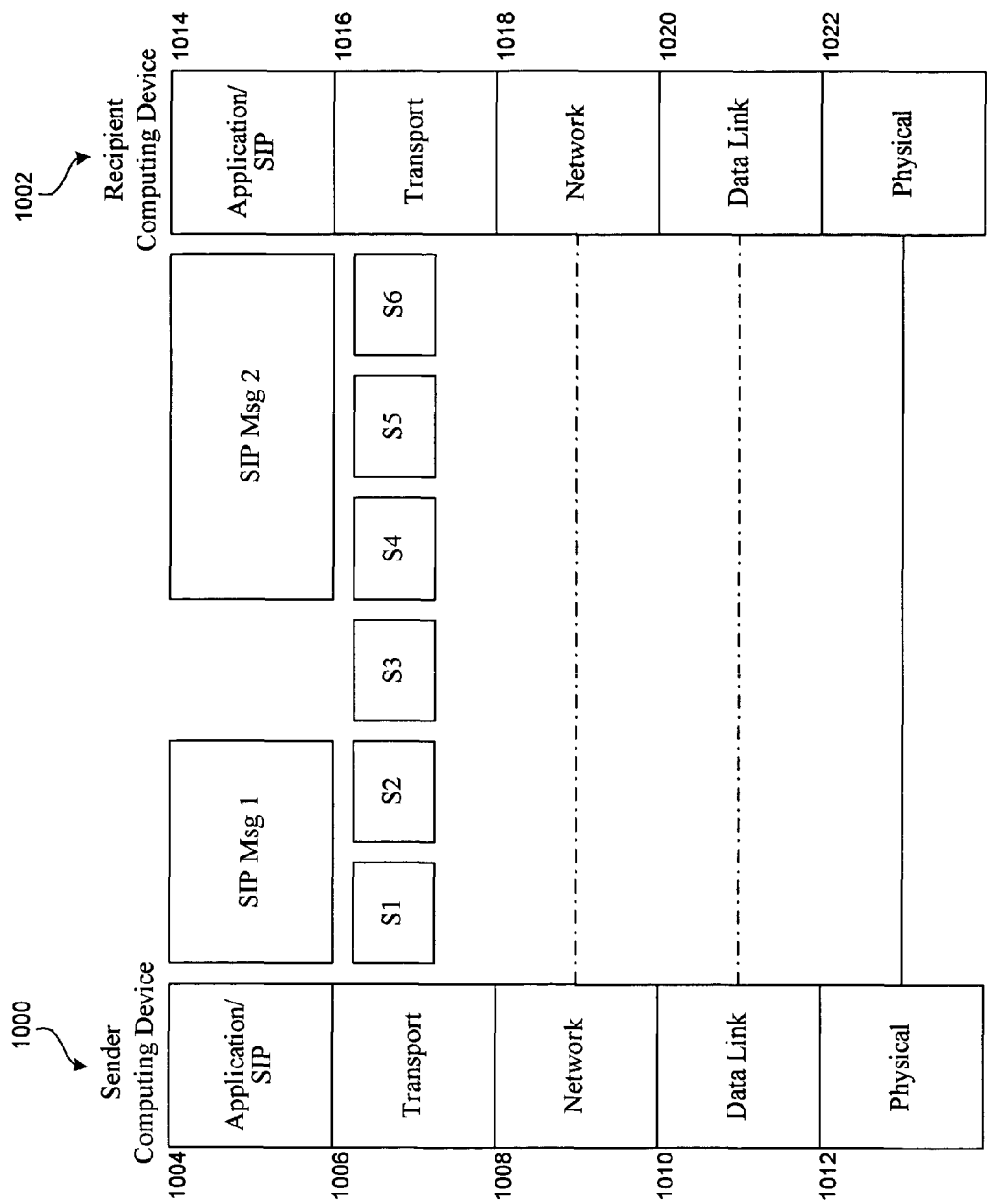
FIG. 10 is a block diagram illustrating a flow of messages in an embodiment.

FIG. 10 is a block diagram illustrating a flow of messages in an embodiment. In the illustrated embodiment, sender computing device 1000 has opened a SIP session with recipient computing device 1002. When the sender computing device sends SIP message 1 through its Application/SIP layer 1004, transport layer 1006 may segment the message into two segments S1 and S2. To prevent a timeout, the sender computing device may send a heartbeat message S3. The heartbeat message may comprise a carriage return, line feed, both, or other information indicative of a heartbeat message that can be ignored by the application. The recipient computing device may then send SIP message 2 that is segmented as transport messages S4, S5, and S6 by transport layer 1016. The segmented messages may be of varying sizes.

In an embodiment, a computing device may send heartbeat messages in some connections and may employ another mechanism with other connections to sustain its connections. As an example, the computing device may employ heartbeat messages when sending messages to its own "home" server or other computing devices connected thereto, because the home server may be able to associate the heartbeat message with the computing device's connection, and store an indication of the association. By doing so, the server may be able to efficiently update the computing device's presence information if the connection is subsequently lost. The computing device may send REGISTER messages in other connections when it may be advantageous to do so. As an example, the computing device may send REGISTER messages when an intermediate device fails to forward heartbeat messages.

Although particular examples discussed herein refer to using SIP and TCP, alternate embodiments may use other equivalent or similar protocols.

The computing device on which the techniques for sustaining session connections are implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the techniques for sustaining session connections may be implemented. The operating environment is only one example of a suitable operating environment and is not intended to suggest any limitation as to the scope of use or functionality of the system. Other well-known computing systems, environments, and configurations that may be suitable for use include personal computers, server computers, hand-held or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The techniques for sustaining session connections may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a proxy computing device for sustaining a session connection between client and server computing devices, the method comprising:

receiving a heartbeat message at the proxy computing device from the client computing device, the client and server computing device having an open session using a session initiation protocol, and the heartbeat message being a valid message of a transport layer protocol and ignored by the session initiation protocol;

resetting a message clock of the session connection between the client and server computing devices;

transmitting the heartbeat message from the proxy computing device to the server computing device, whereby sending the heartbeat message sustains the session connection between the client and server computing devices; and a period of time after receiving the heartbeat message, receiving a second heartbeat message at the proxy computing device from the client computing device.

2. The method of claim 1, wherein resetting the message clock occurs after transmitting the heartbeat message to the server computing device from the proxy computing device.

3. The method of claim 1, wherein the heartbeat message comprises white space characters.

4. The method of claim 3, wherein the white space characters include one or more of a linefeed and a carriage return.

5. The method of claim 1, wherein the transport layer protocol is TCP/IP.

6. The method of claim 1, wherein the message clock measures time elapsed since a previous message was sent or received.

7. The method of claim 1, wherein the message clock relates to messages sent or received by a transport layer of a data communications stack.

8. The method of claim 1, wherein the proxy computing device comprises an edge proxy server.

9. The method of claim 8, wherein the client computing device resides outside of a network and the server computing device resides within the network.

10. The method of claim 1, further comprising, after dropping the session connection, receiving at the proxy computing device a REGISTER message from one of the client and server computing devices.

11. The method of claim 1, further comprising:
determining whether a time interval is exceeded by the period of time.

12. The method of claim 11, further comprising, upon determining that the period of time exceeds the time interval, dropping the session connection between the client computing device and the server computing device.

13. The method of claim 11, further comprising, upon determining that the period of time does not exceed the time interval, resetting the message clock, thereby sustaining the session connection.

14. A proxy computing device communicatively coupled between client and server computing devices and configured to sustain a session connection between the client and server computing devices, the proxy computing device comprising:
a first component executable on the proxy computing device that receives a message via a connection with the client computing device;
a second component executable on the proxy computing device that transmits the received message to the server computing device; and
a third component executable on the proxy computing device that determines whether the received message is a heartbeat message, the heartbeat message being a valid message of a transport layer protocol and ignored by a session initiation protocol, and upon determining that the received message is a heartbeat message, resets a message clock of the session connection between the client and server computing devices, thereby sustaining the session connection between the client and server computing devices
wherein, a period of time after receiving the message, the first component receives a second message via a connection with the client computing device, the second message determined by the third component to be a second heartbeat message.

15. The proxy computing device of claim 14, wherein the proxy computing device comprises an edge proxy server.

16. A method performed by a server computing device for sustaining a session connection, comprising:
establishing a session with a client computing device using a session initiation protocol, the session having a session connection; and
receiving a heartbeat message using a transport layer protocol from the client computing device via a proxy computing device, wherein the session initiation protocol is employed by a higher layer of a data communications stack than the second protocol, and wherein the heartbeat message is a valid message of the transport layer protocol and ignored by the session initiation protocol, and receiving the heartbeat message sustains the session connection at the server computing device; and
a period of time after receiving the heartbeat message, receiving a second heartbeat message at the proxy computing device from the client computing device;
wherein the session is established and sustained between the client computing device and the server computing device through the proxy computing device, and wherein after receiving the heartbeat message at the server computing device from the client computing device, a message clock of the session connection is reset prior to receiving the second heartbeat message.

17. The method of claim 16, wherein the heartbeat message is received when a period of time elapses after a message of the session initiation protocol is received, the period of time being less than a timeout value.

18. The method of claim 16, wherein the message clock of the connection is managed at the proxy computing device.

19. The method of claim 18, wherein the message clock is reset by the proxy computing device.

20. The method of claim 19, wherein the proxy computing device comprises an edge proxy server.

21. The proxy computing device of claim 14, wherein the third component is configured to determine whether a time interval is exceeded by the period of time.

22. The method of claim 16, further comprising determining whether a time interval is exceeded by the period of time.

* * * * *